United States Patent
Hill et al.

(10) Patent No.: US 6,747,569 B2
(45) Date of Patent: Jun. 8, 2004

(54) DOWNHOLE TELEMETRY AND CONTROL SYSTEM

(75) Inventors: Lawrence W. Hill, North Eastham, MA (US); F. Williams Sarles, Lexington, MA (US)

(73) Assignee: DBI Corporation, North Eastham, MA (US)

( * ) Notice: Subject to any disclaimer, the term of this patent is extended or adjusted under 35 U.S.C. 154(b) by 302 days.

(21) Appl. No.: 10/062,293

(22) Filed: Feb. 1, 2002

(65) Prior Publication Data

US 2003/0010493 A1 Jan. 16, 2003

Related U.S. Application Data

(60) Provisional application No. 60/266,189, filed on Feb. 2, 2001.

(51) Int. Cl.[7] .................................................. G01V 3/00
(52) U.S. Cl. .................................................... 340/855.8
(58) Field of Search ........................... 340/854.4, 854.5, 340/855.4, 855.5, 855.8; 367/82; 166/250.15, 250.01

(56) References Cited

U.S. PATENT DOCUMENTS

| | | | |
|---|---|---|---|
| 4,597,082 A | 6/1986 | Hill et al. | 371/32 |
| 5,448,593 A | 9/1995 | Hill | 375/267 |
| 6,633,236 B2 * | 10/2003 | Vinegar et al. | 340/854.4 |
| 2002/0000316 A1 | 1/2002 | Haase | 166/244.1 |
| 2002/0036085 A1 | 3/2002 | Bass et al. | 166/250.01 |
| 2002/0043369 A1 | 4/2002 | Vinegar et al. | 166/250.07 |

* cited by examiner

Primary Examiner—Albert K. Wong
(74) Attorney, Agent, or Firm—Weingarten, Schurgin, Gagnebin & Lebovici LLP

(57) ABSTRACT

A power transmission and data communications system for use in a gas or oil well borehole is disclosed. The borehole includes a casing and a piping structure therein and at least one downhole equipment module located therein. The system provides for the power signal that is used to provide power transfer to be modulated with data and control signals that are to be transmitted to the downhole equipment located in the downhole equipment modules. In particular, the system provides for the power/data signal to be electrically coupled to the case and piping structure for transmission downhole. The downhole equipment includes a power supply that is operative to recover the power signal portion of the power/data signal and to provide power to the other downhole equipment. A downhole receiver is operative to recover the data portion of the power/data signal and to demodulate the data provided thereon. The system can further include a downhole data source coupled to a downhole transmitter for impressing the downhole data onto the case and piping structure for transmission uphole. A receiver contained in the surface equipment is operative to receive and recover the transmitted downhole data for analysis and storage by surface equipment.

38 Claims, 13 Drawing Sheets

DOWNHOLE TELEMETRY AND CONTROL SYSTEM

CROSS REFERENCE TO RELATED APPLICATIONS

This application claims priority under 35 U.S.C. §19(e) to provisional patent application serial No. 60/266,189 filed Feb. 2, 2001; the disclosure of which is incorporated by reference.

STATEMENT REGARDING FEDERALLY SPONSORED RESEARCH OR DEVELOPMENT

N/A

BACKGROUND OF THE INVENTION

This invention relates generally to power and communications systems used to provide power and communications to downhole equipment located in a borehole, and in particular to a power and communications system in which the power signal is modulated with the data to be transmitted.

Oil and gas wells are very expensive to construct, and it is advantageous to operate these wells as efficiently as possible. One way of providing for an increased efficiency in the operation of wells is to place controllable equipment, such as controllable valves, downhole in the well bore under the control of computers located on the surface. Several prior art methods have attempted to provide power and communications between the surface equipment and the downhole equipment.

Some prior art systems have placed cables in the well bore to provide power and communications to the downhole equipment. Safely and accurately placing the cables within the well bore along side of the piping structure or string is difficult and time consuming to achieve. In addition, this requires additional equipment to be used increasing the costs associated with the well. Well bores are a harsh environment, and numerous failure mechanisms exist that cause the reliability of such systems to be unacceptably low.

Several prior art systems have attempted to use wireless communications system, relying upon the inherent coaxial nature of the well bore and the piping structure or tubing string disposed within the bore. These prior art systems however, typically provide a low frequency power signal and a higher frequency data signal. These systems typically use toroidal coils or ferromagnetic choke assemblies placed on the piping structure or strings to provide a sufficiently large series impedance to the data and power signals to electrify a predefined portion of the piping structure or string. This allows downhole equipment that either is within the predefined portion, or that could be coupled to the predefined portion, to receive electrical power by coupling to the predefined portion and the casing, which is typically at ground potential. Thus, the downhole equipment can receive sufficient power for reception of the communications messages and data sent thereto. In addition, the frequency of the power signals in these systems will determine the amount of inductance required and therefore the physical requirements of the choke. Since the power signals are typically low frequency, typically in the 50 Hz. to 400 Hz. range, the size and weight of the chokes can be quite large and cumbersome. This makes these prior art systems unsuitable for multiple-completion wells where the clearance between the tubing strings is small.

In addition, the casings and piping structures used in these wells often have discontinuities that affect the characteristic impedance. These changes, and other changes as well, in the characteristic impedance can lead to multiple reflections of a signal being transmitted. This multipath propagation causes inter-symbol interference and results in an increase in the bit error rate. To compensate for this increase in the bit error rate, the symbol period must be increased to reduce the probability of a symbol being interfered with. In the prior art systems, the lengthening of the symbol period is accomplished by lowering the data rate.

Each individual oil or gas well is a unique environment unto itself. Frequencies and modulation schemes that work in one well, may not be suitable for use in other wells, even those wells located proximate thereto. Prior art systems have suffered from the inability to structure each well individually, since once systems are lowered into place, it is physically difficult, if not impossible, to remove and reconfigure them.

Therefore, it would be advantageous to provide a system for wireless communication and power distribution in a well bore that utilizes smaller choke inductors, does not inherently limit the portion of the well bore that is electrified, and provides for more robust communication signals having a better signal-to-noise-ratio. Additionally, it would be advantageous to provide for a communications system that is unaffected by multipath propagation and may be reconfigured.

BRIEF SUMMARY OF THE INVENTION

A power transmission and data communications system for use in a gas or oil well borehole is disclosed. The borehole includes a casing and a piping structure therein and at least one downhole equipment module located therein. The system provides for the power signal that is used to provide power transfer to be modulated with data and control signals that are to be transmitted to the downhole equipment located in the downhole equipment modules. In particular, the system provides for the power/data signal to be electrically coupled to the case and piping structure for transmission downhole. The downhole equipment includes a power supply that is operative to recover the power signal portion of the power/data signal and to provide power to the other downhole equipment. A downhole receiver is operative to recover the data portion of the power/data signal and to demodulate the data provided thereon. The system can further include a downhole data source coupled to a downhole transmitter for impressing the downhole data onto the case and piping structure for transmission uphole. A receiver contained in the surface equipment is operative to receive and recover the transmitted downhole data for analysis and storage by surface equipment.

In one embodiment, a downhole telemetry and power system for use with a borehole extending into a formation, the borehole including a casing positioned within the borehole and a piping structure contained within the casing is disclosed. The system includes a surface choke coupled to the piping structure to isolate the downhole piping structure and case from any electrical connections uphole therefrom. The system also includes a surface system that includes a data source that provides data to be transmitted, a power amplifier coupled to the data source and also to an external power source. The power amplifier has an output that is electrically coupled to the casing and the piping structure downhole from the surface choke. The power amplifier is operative to provide a power signal having a first frequency and to modulate, in a first modulation scheme, the power signal with the data to be transmitted. The first frequency of power signal is selected as a function of the depth of the borehole.

The system further includes a downhole choke having a first inductance, the downhole choke is disposed downhole a predetermined distance within the borehole and wherein the first inductance is selected as a function of the depth of the borehole. Downhole the system also includes a downhole system including a power supply electrically coupled to the downhole choke. The power supply is configured and arranged to receive at least a portion of the modulated power signal and to provide at least one output voltage. The downhole system further including a receiver electrically coupled to the choke coil and configured and arranged to demodulate the modulated power signal in order to recover the data to be transmitted.

Other forms, features and aspects of the above-described methods and system are described in the detailed description that follows.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

Figure 1:
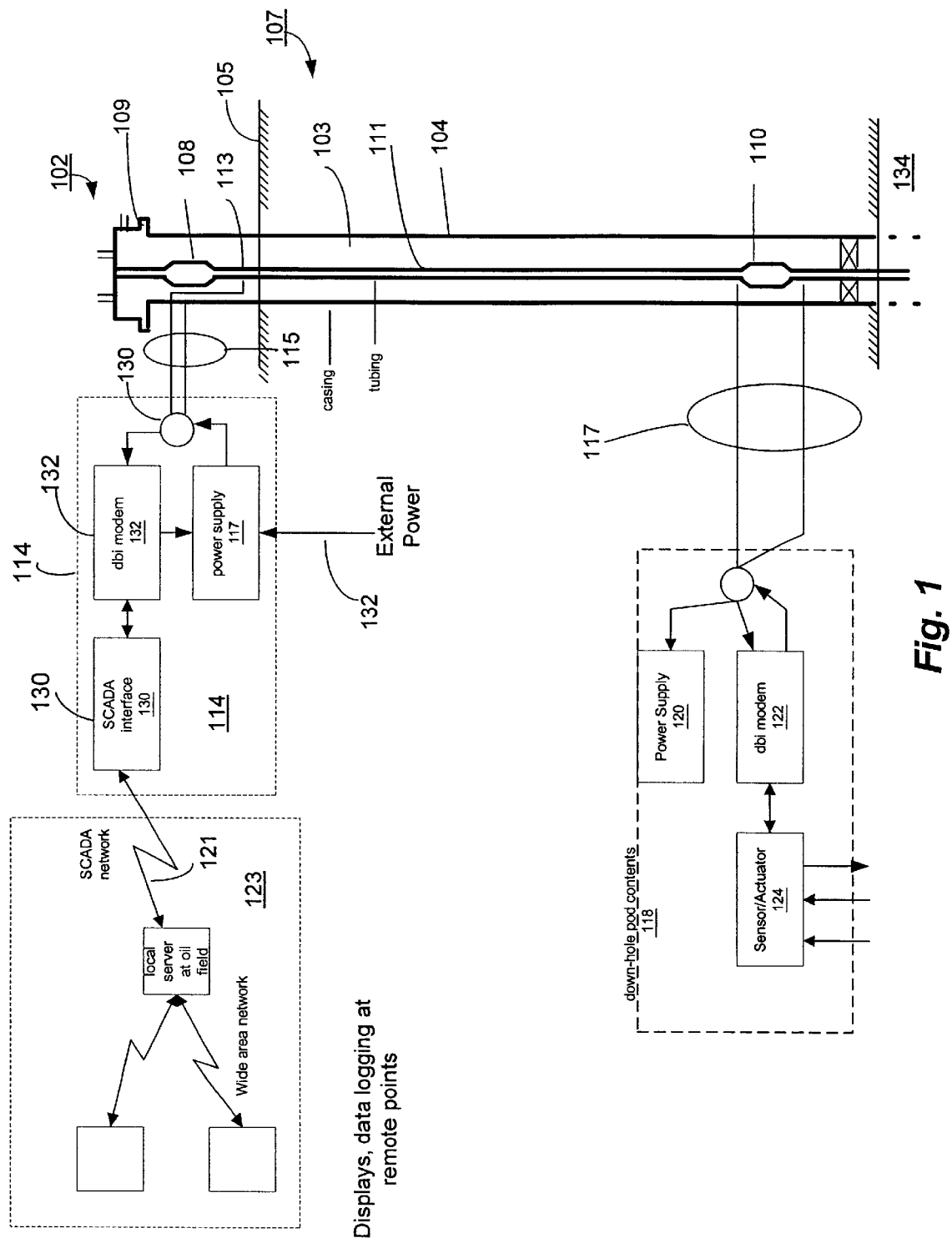
FIG. 1 is a block diagram depicting an embodiment of a downhole communications system described herein.

As used in the present application, a "piping structure" can be one single pipe, a tubing string, a well casing, a pumping rod, a series of interconnected pipes, rods, rails, trusses, lattices and/or supports, a branch or lateral extension of a well, a network of interconnected pipes, or other structures known to one of ordinary skill in the art. The preferred embodiment makes use of the invention in the context of an oil well where the piping structure comprises tubular, metallic, electrically-conductive pipe or tubing strings, but the invention is not so limited. For the present invention, at least a portion of the piping structure needs to be electrically conductive, such electrically conductive portion may be the entire piping structure (e.g., steel pipes, copper pipes) or a longitudinal extending electrically conductive portion combined with a longitudinally extending non-conductive portion. In other words, an electrically conductive piping structure is one that provides an electrical conducting path from a first location where a power source is electrically connected to a second location where a device and/or electrical return is electrically connected. The piping structure will typically be conventional round metal tubing, but the cross-section geometry of the piping structure, or any portion thereof, can vary in shape (e.g., round, rectangular, square, oval) and size (e.g., length, diameter, wall thickness) along any portion of the piping structure. Hence, a piping structure must have an electrically conductive portion extending from a first location of the piping structure to a second location of the piping structure.

A "valve" is any device that functions to regulate the flow of a fluid. Examples of valves include, but are not limited to, bellows-type gas-lift valves and controllable gas-lift valves, each of which may be used to regulate the flow of lift gas into a tubing string of a well. The internal workings of valves can vary greatly, and in the present application, it is not intended to limit the valves described to any particular configuration, so long as the valve functions to regulate flow. Some of the various types of flow regulating mechanisms include, but are not limited to, ball valve configurations, needle valve configurations, gate valve configurations, and cage valve configurations. The methods of installation for valves discussed in the present application can vary widely. Valves can be mounted downhole in a well in many different ways, some of which include tubing conveyed mounting configurations, side-pocket mandrel configurations, or permanent mounting configurations such as mounting the valve in an enlarged tubing pod.

The term "modem" is used generically herein to refer to any communications device for transmitting, receiving, or transmitting and receiving electrical communication signals via an electrical conductor (e.g., metal). Hence, the term is not limited to the acronym for a modulator (device that converts a voice or data signal into a form that can be transmitted)/demodulator (a device that recovers an original signal after it has modulated a high frequency carrier).

The term "wireless" as used in the present invention means the absence of a conventional, insulated wire conductor e.g. extending from a downhole device to the surface. Using the tubing and/or casing as a conductor is considered "wireless."

The term "sensor" as used in the present application refers to any device that detects, determines, monitors, records, or otherwise senses the absolute value of or a change in a physical quantity. Sensors as described in the present application can be used to measure temperature, pressure (both absolute and differential), flow rate, seismic data, acoustic data, pH level, salinity levels, valve positions, or almost any other physical data.

The term "electronics module" in the present application refers to a control device. Electronics modules can exist in many configurations and can be mounted downhole in many different ways. In one mounting configuration, the electronics module is actually located within a valve and provides control for the operation of a motor within the valve. Electronics modules can also be mounted external to any particular valve. Some electronics modules will be mounted within side pocket mandrels or enlarged tubing pockets, while others may be permanently attached to the tubing string. Electronics modules often are electrically connected to sensors and assist in relaying sensor information to the surface of the well. It is conceivable that the sensors associated with a particular electronics module may even be packaged within the electronics module. Finally, the electronics module is often closely associated with, and may actually contain, a modem for receiving, sending, and relaying communications from and to the surface of the well. Signals that are received from the surface by the electronics module are often used to effect changes within downhole controllable devices, such as valves. Signals sent or relayed to the surface by the electronics module generally contain information about downhole physical conditions supplied by the sensors.

The terms "up", "down", "above", "below" as used in this invention are relative terms to indicate position and direction of movement, and describe position "along hole depth" as is conventional in the industry. In highly deviated or horizontal wells, these terms may or may not correspond to absolute relative placement relative to the earth's surface.

FIG. 1 depicts an embodiment of the presently described apparatus and method for providing power and communications to and from downhole equipment in which the data signal to be transmitted from the surface is modulated onto the power signal. This signal, "the power/data signal", provides power to the downhole equipment and serves as a carrier frequency for the data as well.

Referring to FIG. 1 in the drawings, a well 107 includes a borehole 103 extending from the surface 105 into a production zone 134 that is located downhole. A production platform 102 is located at surface 105 and includes a hanger 109 for supporting a casing 104 and a piping structure 111. Casing 104 is of the type conventionally used in the oil and gas industry and is typically installed in sections and is secured in borehole 103 during well construction, typically using cement. Piping structure 111 is also referred to as tubing string or production tubing is generally a conventional string that includes a plurality of elongated tubular pipe sections joined together by threaded couplings at each end of the pipe sections.

The power/signal apparatus further includes a power/data source 114 that is coupled to the piping structure 111 and to the casing 104 via cables 115. The piping structure 111 acts the hot lead and the casing 104 acts as the ground/electrical return path for the power/signal system described herein. A power amplifier 117 in the power/data source 114 receives external power 119 from an external source (not shown) and provides a power signal to the piping structure which comprises an amplified version of the output signal of modem 132. This signal has a first frequency, a first amplitude and a first current.

Similarly, a data interface 130 in the power/signal apparatus 114 receives external data/commands 121 to be transmitted from external data equipment 123 and provides the data/commands 121 to a modem 132 for transmission downhole therefrom. In one embodiment, the data interface is a Supervisory Control And Data Acquisition (SCADA) interface, and the data equipment 123 can include a local server at the oil field. The local server can be interfaced via the internet or other wide area network, via a phone line, wireless, or satellite connection to data logging equipment, displays, controllers, or other data processors located remotely from the well.

Under control of external data equipment 123, the SCADA interface 130 performs appropriate protocol conversion and formatting of information for transmission by the modem 132. The output of the modem 132 drives the power amplifier 117 and provides an output power signal that is modulated with the data/commands 121 to be transmitted using the first modulation scheme into a data packet format discussed below. This combined power and data signal is electrically coupled to the piping structure 111 and the casing 104 via cables 115 and propagates downhole thereon. In one embodiment, the first frequency of the power signal is in the 0.60 KHz to 7.5 KHz band, and in particular is selected from the group of 0.750 kHz, 1.5 kHz, 3 kHz, and 6 kHz. The data is then modulated over this carrier frequency using a digital modulation scheme. In a preferred embodiment the digital modulation scheme is a 16-point Quadrature Amplitude Modulation (16 QAM). Other frequencies and digital modulation schemes can be selected of course depending upon the particular system requirements.

A surface choke 108 is disposed on the piping structure 111 between the coupling location 113 and the top of the well head 109 where the piping structure 111 and the casing 104 are coupled together. Since the combined power and data signal is electrically coupled to the piping structure downhole from the surface choke 108 and the casing 104, the overall effect is to impress the combined power and data signal across the parallel connected combination of surface choke 108 and downhole piping structure.

In one embodiment, the surface choke is sized and configured to approximate the characteristic impedance of the piping structure 111 for the range of predetermined frequencies employed for the up-channel. Alternatively, the surface choke may be sized to provides an impedance that is larger than the characteristic impedance of the piping structure 111. This allows additional circuitry to be added in parallel with the surface choke such that the overall impedance as seen by the surface modem provide a closer match to the characteristic impedance over the range of frequencies employed. In addition, the surface choke isolates the electrical short circuit at the top of the well from the downhole piping structure 111/casing 104 transmission line at both the power/data downhole signal and the data uphole signal.

The combined power and data signal, or just the power signal if there is no modulation present, preferentially propagates down the borehole 103 to downhole choke 110 and develops a voltage across the downhole choke 110. As will be explained in more detail below, the downhole choke 110 is sized, dimensioned, and configured as a function of the well depth and the number of other downhole chokes which are used.

The downhole equipment 118 includes a power supply 120, a modem 122, and a sensor/actuator module 124. The downhole equipment 118 is coupled across the corresponding downhole choke 110. The power supply 120 provides power to the downhole modem 122 and sensor/actuator module 124, and the downhole modem 122 receives and demodulates data provided by the surface modem. The modem 122 provides the data or commands to the sensor/actuator module 124.

The downhole equipment 118 can also transmit data from the sensor/actuator module 124 to the surface for reception by the surface equipment 114. In general, sensor data received from sensor/actuator module 124 is provided to the modem 122 that modulates a carrier signal at a second frequency with a second modulation scheme and impresses the modulated carrier signal across the downhole choke 110.

The modulated carrier signal propagates via the case 104 and the piping structure 111 to the uphole equipment 114. The surface equipment 114 includes the modem 132 that receives and demodulates the modulated carrier signal and provides the data, via the data interface 130 to the data equipment 123. In general the system described herein preferably operates in a half-duplex mode of operations wherein the surface modem waits for the appropriate downhole modem to provide a data received message in response to a data message addressed to it.

Figure 2:
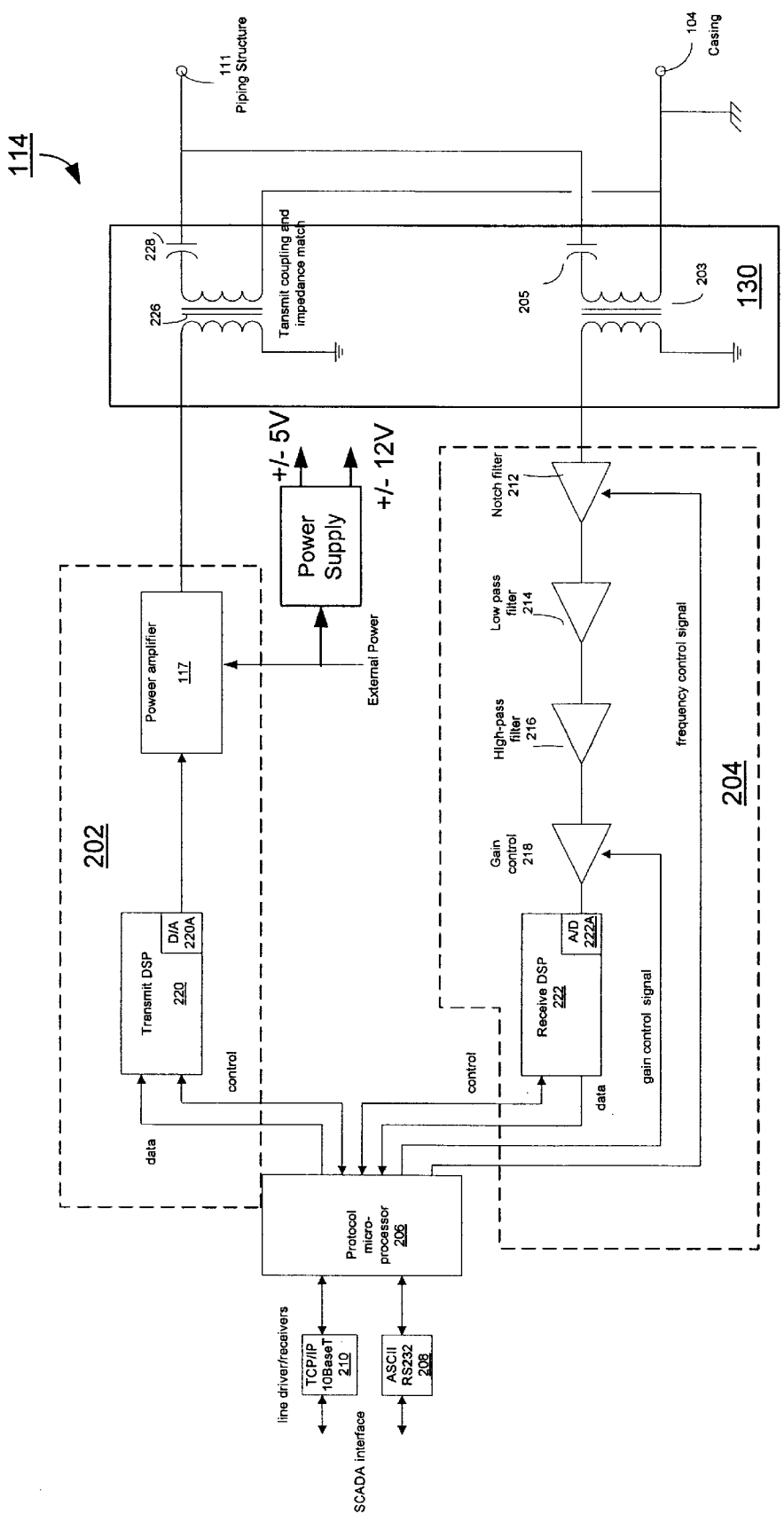
FIG. 2 is a block diagram of the surface module depicted in FIG. 1.

FIG. 2 depicts the surface equipment 114 in more detail. In particular, the surface equipment includes a protocol processor 206 that is operative to provide the data protocol and line conditioning functions. In one embodiment, a master/slave protocol is employed in which the master is the surface equipment modem 132 and the one or more downhole modems are the slaves, wherein each downhole modem is identified by a unique modem address. The surface equipment modem 132 transmits packets to specific downhole modems as directed by its data interface, wherein each downhole modem has a unique address. The downhole modems only reply to packets bearing their unique address. In this way, the surface equipment modem 132 will establish a network having one or more downhole modems.

The external data interface specified to the surface equipment modem 132 establishes the frequency of the power signal and the corresponding bit rate to be used and provides this information to the one or more downhole modems via the packet structure. The transmission frequency is predetermined and set during installation, and may be altered via the external data interface. Each data packet transmitted by the surface modem contains a field indicating the transmission frequency. This data is used by the downhole modems to adjust or switch the frequency of the power/data signal. The various downhole modems store this frequency in retentive memory and use the stored setting upon power-up. If a downhole modem does not receive a signal from the surface modem, the downhole modem systematically searches the predetermined frequency/data rate combinations until a signal is received.

All of the modems, both the surface and the downhole modems, adaptively change the gain of their input amplifier to optimize information transfer between them as well. Each downhole modem monitors the bit error rate across a small number of packets. The downhole modem 132 changes the gain of the input amplifier in a first direction and monitors the bit error rate across the same number of data packets as before. If the new bit error rate is less than the previous bit error rate, the downhole modem changes the gain again in the same first direction and the bit error rate is again measured. If the new bit error rate is greater than the previous bit error rate then the gain is changed in a second direction, opposite to the first direction, and the bit error rate is measured. If a predetermined number of changes does not result in a change of gain, then a bit rate peak has been found and the gain is maintained at the current value for a predetermined period of time.

The surface modem 132 includes a power supply 232, a receiver 204, and a transmitter 202. The receiver 204 and the transmitter 202 are coupled to the piping structure 111 and the casing 104 via the coupler 130 that includes a receive coupler 203 and a transmit coupler 226. The power supply 232 is coupled to an external power source 132 and provides selected output voltages. In the illustrative embodiment, the power supply 232 provides +/−5V and +/−12V.

The receiver 204 includes an input notch filter 212 that receives the transmitted signal from the receive coupler 203 and that is coupled to the protocol processor 206 and receives the frequency data therefrom. The notch filter 212 is designed to provide a passband that includes the uphole communications signal frequency but blocks the frequency of the unmodulated downhole power signal. In one embodiment, the notch filter provides 80 dB of attenuation to the power signal carrier frequency. Accordingly, the notch filter is responsive to a frequency command received from the protocol processor 206 and adjusts the center frequency of the notch to correspond to the selected uphole communications signal frequency. The notch filter 212 provides the notch-filtered signal to a lowpass and a highpass filter 214 and 216 respectively. The lowpass filter 212 and highpass filter 214 together form a bandpass filter that has a passband that corresponds to the carrier signals used in the uphole communications signal provided by the downhole modem. The filtered signal is then provided to a variable gain amplifier 218 that is coupled to the protocol processor 206. The protocol processor adjusts the gain of the amplifier as discussed above. The filtered and amplified signal is then provided to the receive DSP 222 via A/D converter 222A, which is preferably an eight-bit analog to digital converter. The receive DSP 222 performs the required functions that are required for demodulation of the particular modulation scheme. Such functions may include without limitation, packet synchronization, de-modulation, bit de-interleaving, packet de-framing, symbol decoding, and error correction of the particular modulation scheme. This data is then provided to the protocol processor 206 that provides the data in an output data format. For example, the data output format may be in a TCP/IP format or an ASCII based format suitable for use with an RS-232 link to a conventional oilfield SCADA system. Preferably, the receive DSP is a programmable DSP processor of the sort available from Texas Instruments, Analog Devices, and other manufacturers.

The surface modem also includes a transmitter 202. The transmitter 202 includes a transmitter DSP 220 that is coupled to the protocol processor 208 and receives data to be transmitted and control signals therefrom. The transmitter DSP 220 performs the various functions required for transmission of data. These functions can include without limitation bit interleaving, packet framing, symbol encoding, modulation in the first modulation format. The output of the transmitter DSP 220 is passed to D/A 220A, which is preferably an eight-bit digital to analog converter, and then to the power amplifier 117.

Power amplifier 117 receives the data to be transmitted from the D/A 220A and is further coupled to an external power source 132. The power amplifier provides the power signal with or without data modulation as discussed above. The power amplifier can be a conventional analog push-pull amplifier that is sized and configured to drive the pipe structure through the coupler 130 and in particular via transmitter coupler 226 and series capacitor 228. In the illustrated embodiment, the transmitter coupler 226 is a transformer having a turns ratio that provides for a proper impedance match between the power output stage of the amplifier and the characteristic impedance of the piping structure 111. Alternatively, the power amplifier may be a high frequency switching circuit with switching control and feedback compensation provided by the transmit DSP 220.

Figure 3:
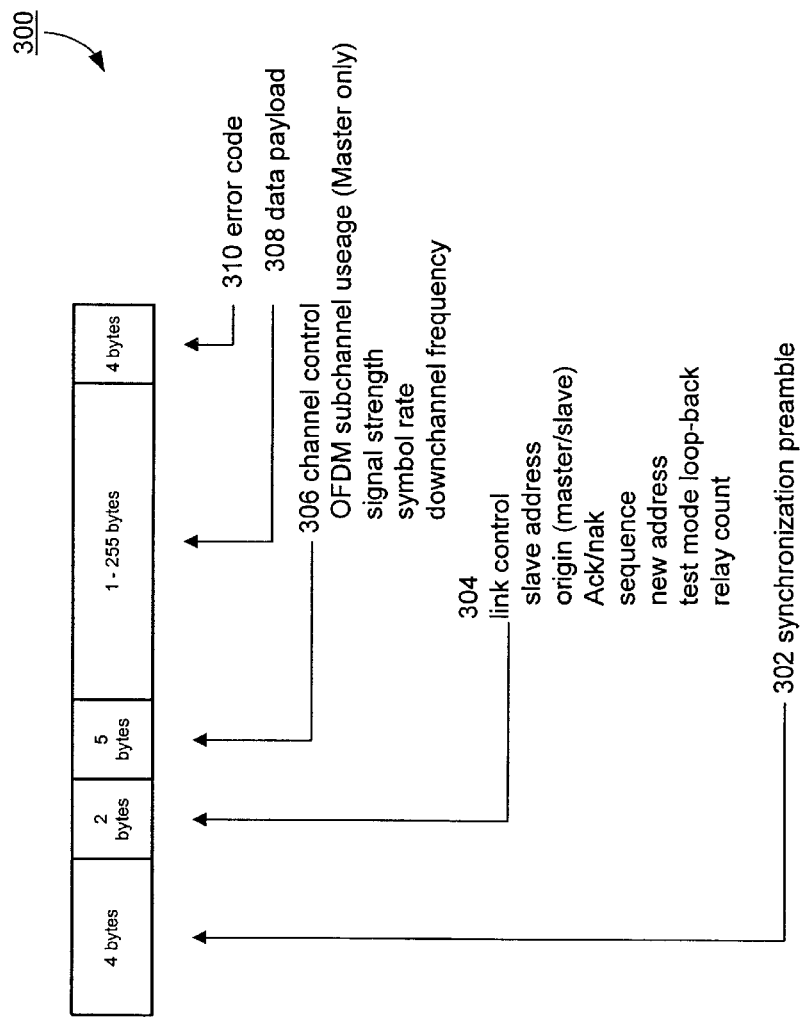
FIG. 3 is a schematic representation of a data packet suitable for use with the downhole communications system depicted in FIG. 1.

FIG. 3 depicts a packet suitable for use with the downhole communications apparatus described herein. The packet 300 includes a four-byte synchronization preamble 302, a two-byte link control portion 304 that includes a slave address, the origin of the packet, acknowledgement, sequence, a new address, or a test mode loop back setting. The packet 300 also includes a channel control portion 306 that provides for signal strength, symbol rate, down-channel frequency, and as will be explained in more detail below, an orthogonal frequency division multiplex sub-channel usage. The packet further includes one to two hundred fifty five bytes of data payload 308 and four-bytes of error codes 310.

Figure 4:
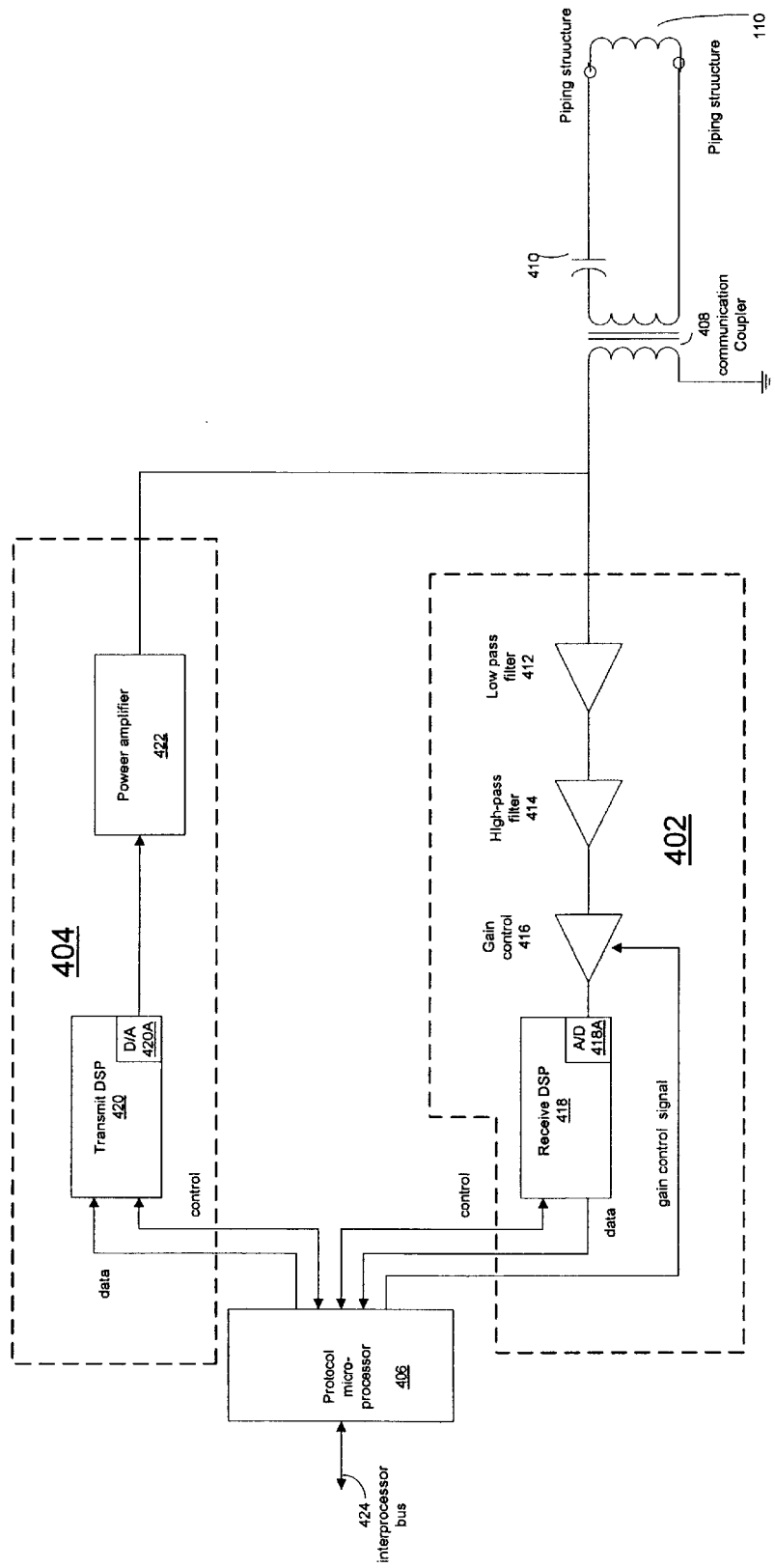
FIG. 4 is a block diagram of the downhole modem depicted in FIG. 1.

FIG. 4 depicts an embodiment of the downhole modem 122. The downhole modem 122 includes a receiver 402 and a transmitter 404 that are coupled to the piping structure 111 and across the downhole choke 110 via a communications coupler 408 and a series capacitor 410. The communications coupler 408, which in the illustrated embodiment is a transformer, and the series capacitor provide a first stage bandpass filter function. The receiver 204 includes an input lowpass filter 412 that receives the transmitted signal from the communications coupler 408 and provides the lowpass filtered signal to a highpass filter 414. The bandpass filter action of the communications coupler 408 and the series capacitor 410 in combination with the lowpass filter 412 and the highpass filter 414 provide a passband for the carrier frequency of the power/data signal. In the illustrated embodiment the passband is from 0.3 kHz to 8 kHz, where the carrier signal of the power/data signal is 0.6 kHz to 7.5 kHz. The filtered signal is then provided to a variable gain amplifier 416 the gain of which is determined by the protocol processor 406. The protocol processor 406 adjusts the gain of the amplifier 416, as discussed above. In the illustrated embodiment, the gain can be selected from 0 to 64 dB in 8 logarithmically equal steps. The filtered and amplified signal is then provided to the receive DSP 418 via A/D converter 418, which is preferably an eight-bit analog to digital converter. The receive DSP 418 performs the functions required for demodulation of the particular modulation scheme. In the illustrated embodiment, a 16 QAM digital modulation scheme is used and can be demodulated using conventional DSP methods. Such functions may include without limitation, synchronization, demodulation, bit de-interleaving, packet de-framing, symbol decoding, error detection and correction of the particular modulation scheme used in the downhole transmission of data. This data is then provided to the protocol processor 406 that provides the data in an output data format on interprocessor bus 424. The interprocessor bus is used to interconnect multiple application related function blocks that may be present in different combinations depending on the system requirements of a particular well borehole. In the illustrated embodiment, the interprocessor bus is a SPI bus of the form included in many industry-standard embedded controllers, for example those offered by National Semiconductor and Microchip.

The downhole modem 122 also includes a transmitter 404. The transmitter 404 includes a transmitter DSP 420 that is coupled to the protocol processor 406 and receives data to be transmitted and control signals therefrom. The transmitter DSP 420 performs the various functions required for transmission of data. These functions can include without limitation bit interleaving, packet framing, symbol encoding, modulation in the modulation format selected for the uphole transmission of data. The output of the transmitter DSP 420 is passed to D/A 420A, which is preferably an eight-bit digital to analog converter, and then to the power amplifier 422. In the illustrated embodiment, the carrier signal for the data transmitted uphole by the downhole modem is in the 60–124 kHz band. In the illustrated embodiment the data transmitted uphole is modulated using a quadrature phase shift keying (QPSK) and orthogonal frequency division multiplexing (OFDM).

Power amplifier 422 is a conventional analog push-pull amplifier that is sized and configured to drive the pipe structure through the communications coupler 408 and series capacitor 410. In the illustrated embodiment, the communications coupler 408 is a transformer having a turns ratio that provides for a proper impedance match between the power output stage of the amplifier and the characteristic impedance of the piping structure 111. Alternatively, the power amplifier may be a high frequency switching circuit with switching control and feedback compensation provided by the transmit DSP 420. The circuitry of the power amplifier and the coupler is such that when the downhole modem is not transmitting data, the impedance of the power amplifier in parallel with choke 110 is low in the frequencies employed for up-channel modulation. This low impedance at the up-channel frequencies permits signals from downhole modem units that are situated further down the tubing string to pass through the intermediate downhole units to the surface modem.

Figure 5:
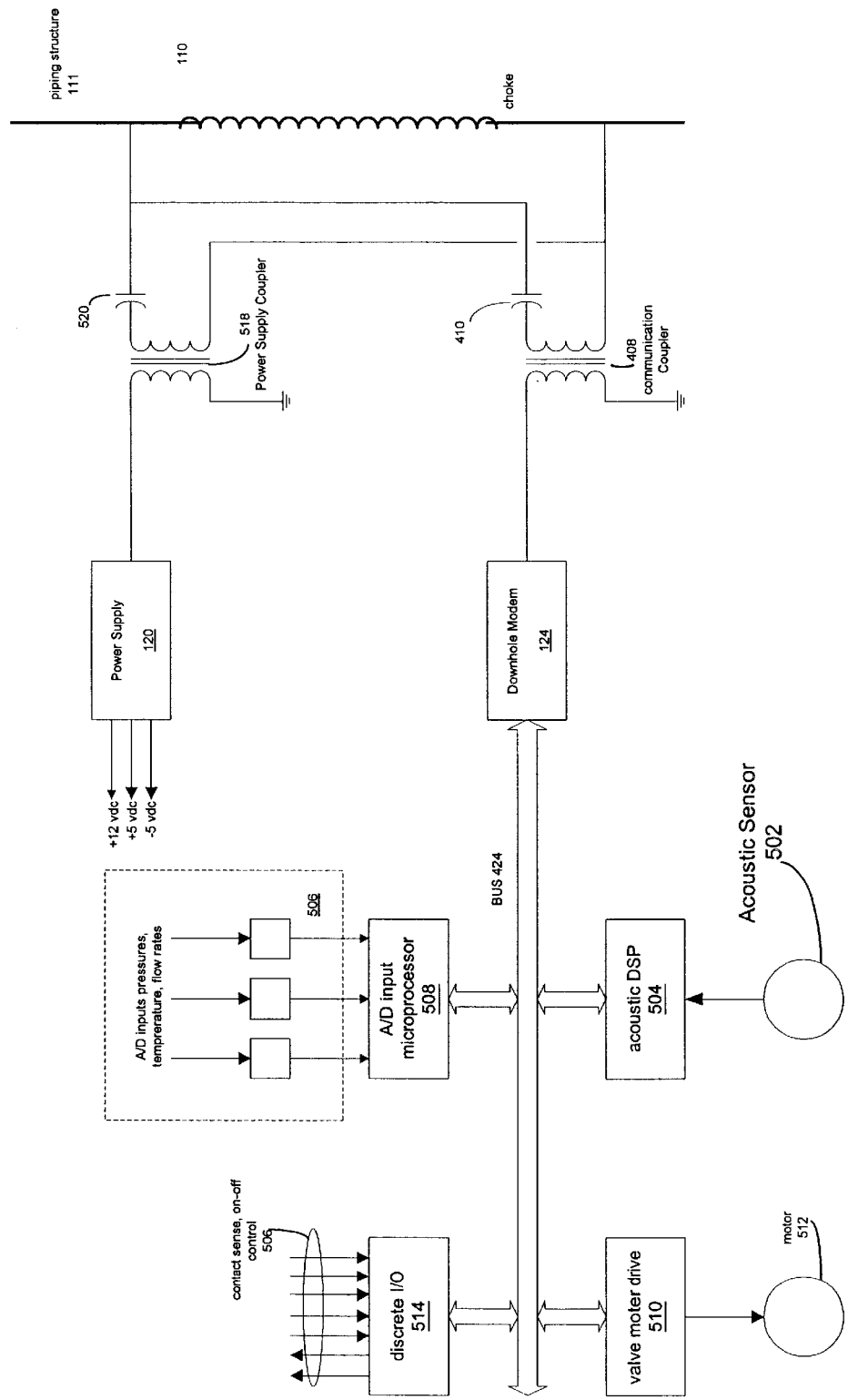
FIG. 5 is a block diagram of the down-module depicted in FIG. 1.

FIG. 5 depicts a more detailed block diagram of the downhole equipment 118. In FIG. 5, a communications coupler 408 and series capacitor 410 are coupled to the downhole choke 110 as described above with respect to FIG. 4. The downhole modem 124 is configured and arranged as discussed above with respect to FIG. 4. The interprocessor bus 424 is coupled to one or more sensor/actuators within module 124. The sensor/actuator module 124 can include one or more sensors as depicted in FIG. 5 and may also include microprocessors or controllers as well. The sensors may include an acoustic sensor 502 coupled to a acoustic DSP module 504 that is interfaced to the interprocessor bus 424. Other sensors may include various analog sensors such as pressure, temperature, and flow rate sensors that are coupled to one or more analog to digital converters 508, or to an A/D input for a microprocessor. In addition, one or more actuators may be coupled to the interprocessor bus 424. The actuators may include one or more valve motor drivers 516 that are coupled to and drive one or more corresponding motors 512. In addition, there may be discrete input/output drivers 514 that drive actuators or receive data from other inputs. These actuators and sensors 516 may include contact sensors, on/off control inputs, or other input/outputs necessary for the efficient operation of an oil or gas well.

The downhole equipment 118 also includes a power supply 120 coupled across the corresponding downhole choke 110 via power coupler 518 and series capacitor 520. The power supply 120 is operative to receive the modulated power signal and convert it to one or more output voltages that are required to power the downhole equipment. In the illustrated embodiment, the power supply 120 is a switching power supply operating at 200 kHz or higher. The power supply 120 is operative to convert the received power signal at the first frequency and provides DC output voltages of +12 volts and +/−5 volts.

An important consideration in the design and implementation of the above described system is the impedance value at various points in the well bore. The impedance in the borehole of the well is a function of the frequency of the signal of interest and the depth of interest. The piping structure 111 and the casing 104 of the well form a coaxial transmission line that serves to conduct power and communications signals to and from the downhole module(s). For the illustrated embodiment, the annulus between the outer surface of the piping structure 111 and the inner surface of the casing 104 is filled with compressed air or another compressed gas. Thus, the relative dielectric constant of the coaxial structure is one and transverse electromagnetic (TEM) propagation occurs at the free space velocity of light, approximately 1ns/ft. For a signal having a frequency such that the wavelength is less than one-tenth of the transmission line length, a simple lumped circuit model is accurate enough for design and implementation purposes. For a ten-thousand foot well, the one-tenth wavelength corresponds to a frequency of about 10 kHz. For a steel pipe used as the piping structure 111, the skin depth at 1 kHz is approximately 19 mils, at 60 Hz the skin depth is approximately 75 mils. Since the casing 104 and piping structure 111 are significantly thicker than this, calculations of the series impedance should include the surface impedance that arises from skin effect. At the lower frequencies of interest, the series resistance of the steel coaxial system is dominated by skin depth; also the series inductance arising from the skin 111 can be calculated by first calculating the skin depth:

$$\delta = \sqrt{\frac{\rho}{\pi \cdot f \cdot \mu_0 \cdot \mu_r}} \quad (1)$$

and then calculating the series resistance/unit length of the coaxial structure arising from the skin effect that is given by:

$$R_s = \sqrt{\frac{\rho \cdot f \cdot \mu_0 \cdot \mu_r}{\pi}} \left(\frac{1}{d_0} - \frac{1}{d_i}\right) \quad (2)$$

The inductance inherent to the coaxial geometry bounded by the outer surface of the piping structure 111 and the inner surface of the casing 104 is given by:

$$L = 200 \ln\left(\frac{d_0}{d_i}\right) \frac{nH}{m} \quad (3)$$

and the capacitance is given by:

$$C = \frac{1}{18 \cdot \ln\left(\frac{d_o}{d_i}\right)} \frac{nF}{m} \quad (4)$$

Where $\rho$ is the resistivity of conductor, $\mu_0$ is the permeability of free space, $\mu_r$ is the relative permeability of the conductor, f is the frequency of interest, $d_0$ is the inner diameter of the casing 104, and $d_i$ is the outer diameter of the piping structure 111.

Figure 6:
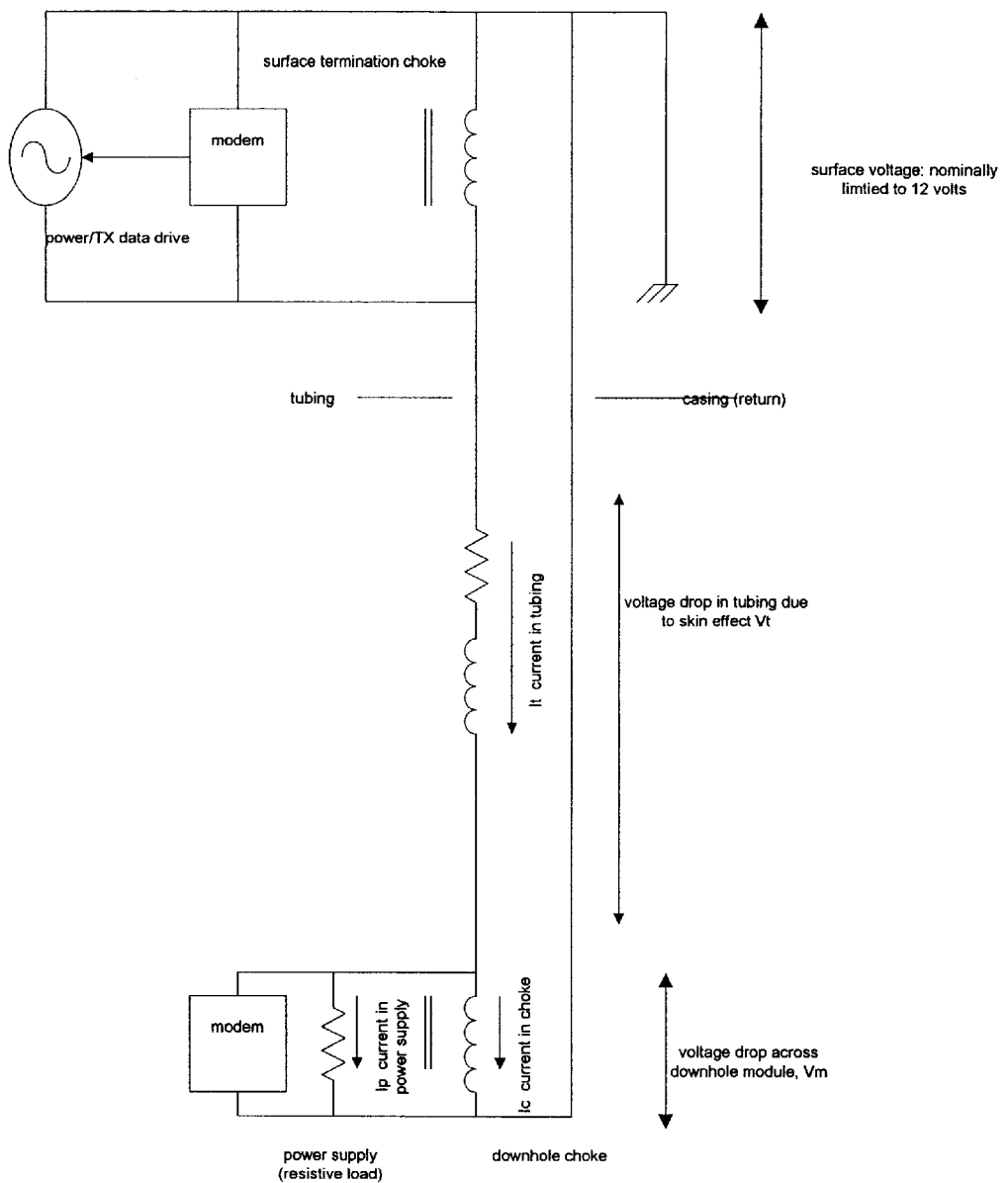
FIG. 6 is a schematic of a low frequency model of the communications system depicted in FIG. 1.
Figure 7:
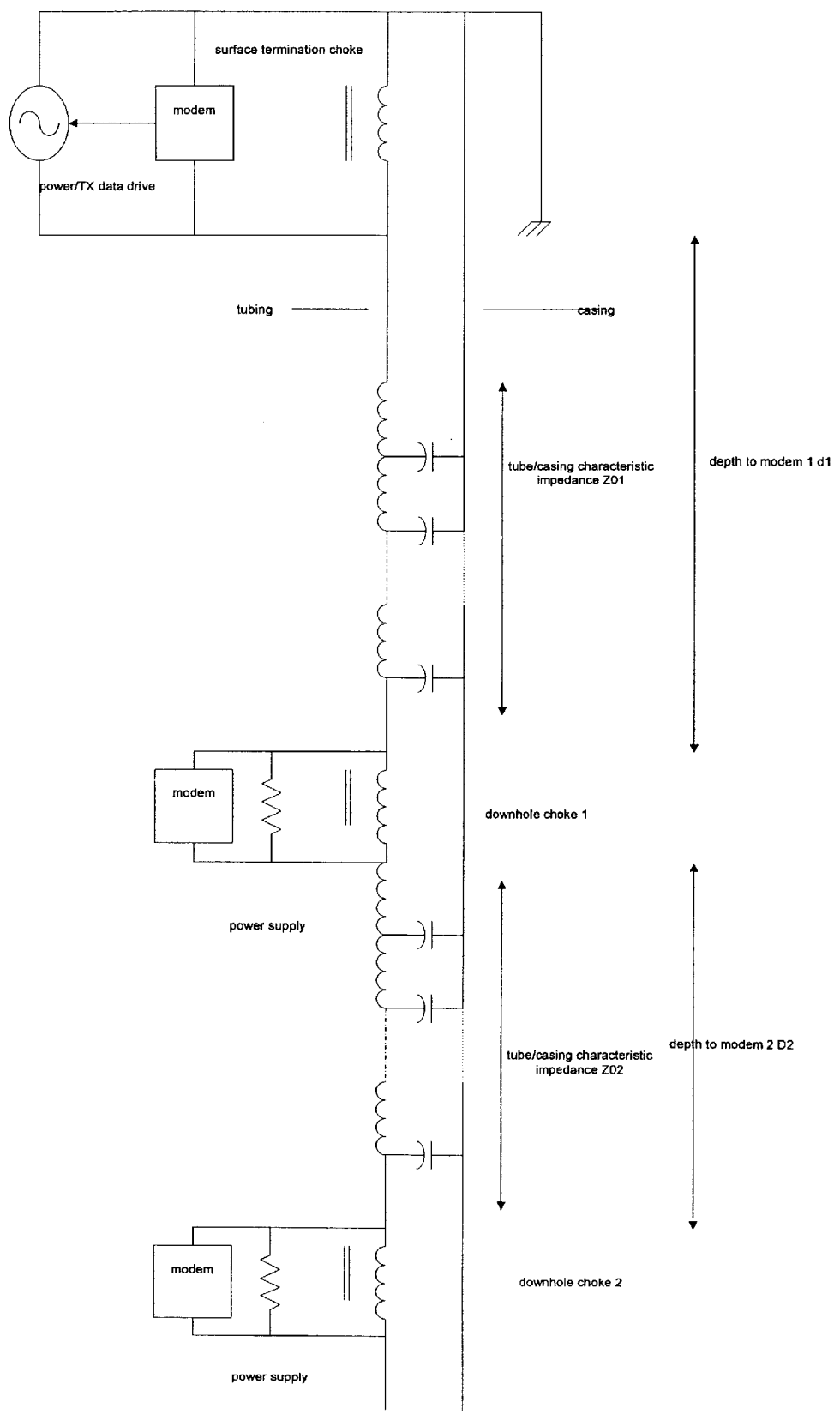
FIG. 7 is a schematic of a high frequency model of the communications system depicted in FIG. 1.

FIG. 6 depicts a low frequency model of the well structure. It should be noted that the series resistance and the series inductance dominate the series impedance of the low frequency model, and that the shunt capacitance is not significant at these frequencies. Inductance variation with frequency of the downhole choke is highly dependent on the materials and construction techniques employed in making the choke. In general, at low frequencies where losses are negligible, the choke impedance increases linearly with frequency. As losses become more significant with increasing frequency, the rate of change of this impedance with respect to frequency can change from a linear relationship to a square root or cube root relationship FIG. 7 depicts a high frequency model of the well structure, in which two downhole chokes and corresponding downhole modules are shown. The first downhole choke is referred to as a mid-hole choke and the corresponding mid-hole module can be connected in parallel with the corresponding choke. This is referred to as a series connection. The impedance solely provided by a few feet of the piping structure 111 is inadequate to develop sufficient voltage to transfer both power and communications signals. For a mid-hole module, the corresponding choke increases the local impedance of the piping structure and provides sufficient impedance to develop sufficient voltage to locally transfer both power and communications to the mid-hole module. In doing so however, the voltages available downhole from this mid-hole location will be decreased due to the voltage division of the series connected impedances.

Alternatively, the mid-hole module may be connected from the piping structure 111 to the case 104. This is referred to as a parallel-connected mid-hole module. In this instance, a sufficient voltage is developed between the case and the piping structure to transfer both power and communications. In this alternative connection, no mid-hole choke is required and the attenuation of the power/data signal due to voltage division is not present. However, in this alternative embodiment a reliable electrical connection to the case from the module mounted on the piping structure is required and may introduce some mechanical complexity.

Figure 8:
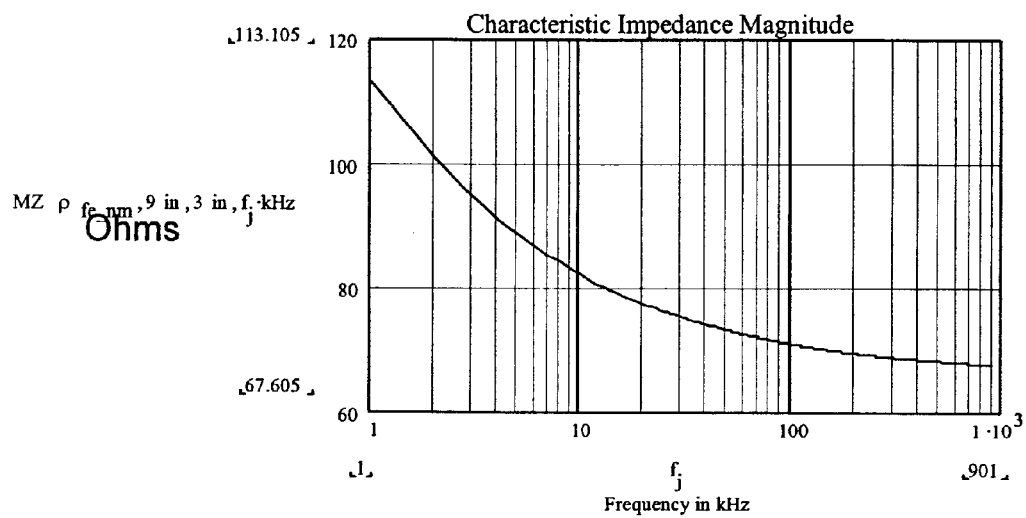
FIG. 8 is a graph depicting the calculated relationships between the magnitude of the characteristic impedance of a typical 10,000 ft. deep well and frequency.
Figure 9:
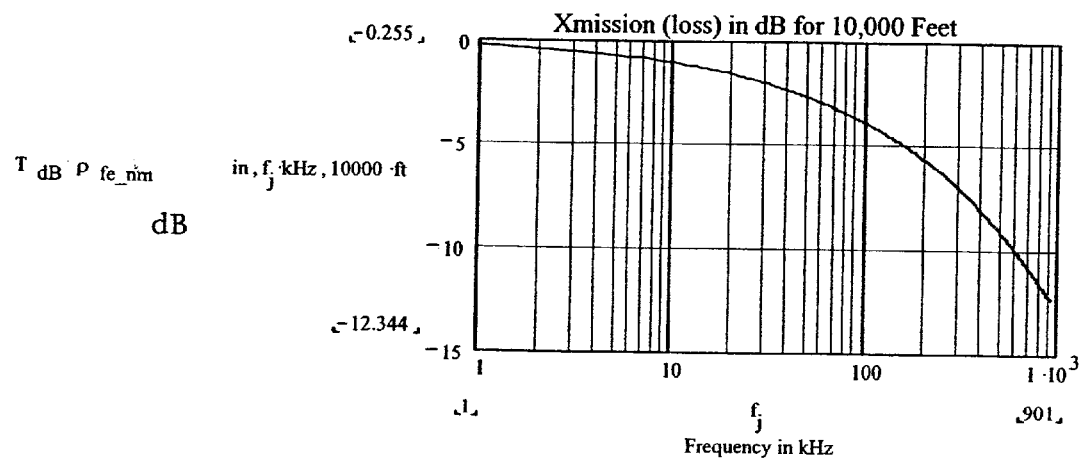
FIG. 9 is a graph depicting the calculated relationships between the transmission loss in dB for a typical 10,000 ft. deep well and frequency; between the time delay dispersion for a typical 10,000 ft. deep well and frequency.
Figure 10:
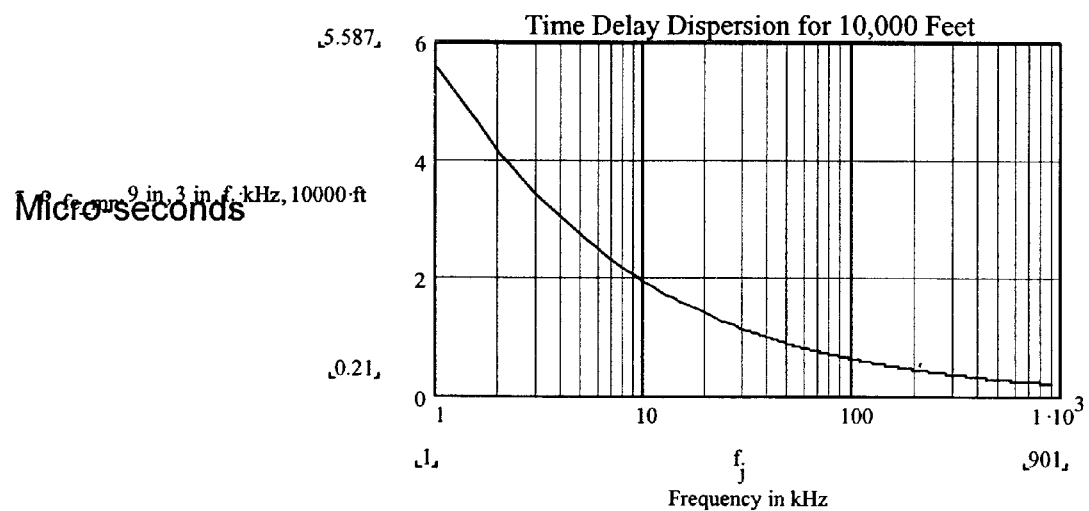

For the frequencies of interest in FIG. 7, the distributed model must include the series resistance, the series inductance, and the shunt capacitance. For a coaxial steel structure that includes a 9" inner diameter casing 104 and a 3" outer diameter of the piping structure 111, FIGS. 8, 9, and 10 depict the variation of the characteristic impedance, the variation of the attenuation, and the time dispersion of this system for a frequency range between 1 kHz and 100 kHz. Although the attenuation and time dispersion appear benign from a communications system perspective, empirical observations on wells indicate that attenuation at the higher frequencies, i.e., 20 kHz to 100 kHz may be significantly higher than theory would suggest. For these higher frequencies, system calculations based on these analytical calculations should be considered to be a lower bound on the variable of interest.

Figure 11:
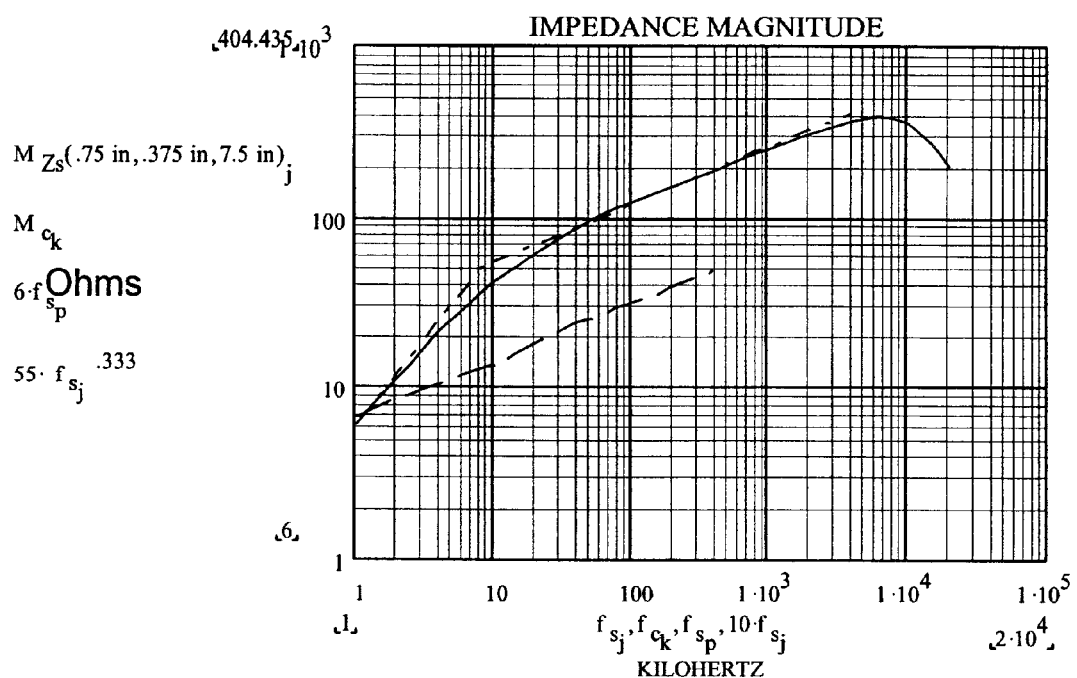
FIG. 11 is a graph depicting the measured relationships between the impedance magnitude and frequency of a typical ferromagnetic choke.

FIG. 11 depicts empirical data for a scaled down model of a downhole choke. This choke was composed of 20 toroids of 1 mil Supermalloy (manufactured by Magnetics Inc), each toroid has an outer diameter of 1.5", an inner diameter of 0.75", and a height of 0.375". Thus, the entire choke has a length of 7.5". The assembly of toroids was mounted in a 20" long copper coaxial system which had negligible contribution for the impedance measured. The impedance of this choke from 1 kHz to 20 MHz is given by the solid trace 1102. The break in slope at 10 kHz (emphasized by dot-dash lines) is caused by eddy currents starting to become significant around a few kHz. The decrease of impedance above 7 MHz may be due to the decreasing capacitive impedance between overlapping wraps of the Supermalloy.

To facilitate the design of the power matching networks at low frequencies, it is desirable that the capacitance values are not overly large for forming parallel resonant structures in conjunction with a corresponding choke. In addition, in some situations it may be desirable for the choke impedance to exceed the piping structure/casing characteristic impedance at the higher frequencies used for the uphole communications signals, although this is not required. A choke with double the impedance of that depicted in FIG. 11 meets these criteria. Thus, for a downhole signal having a frequency of 1 kHz, the inductive reactance for a 10,000 ft. well is 12 ohms, leading to a corresponding resonating capacitance of 13.25 microfarads. In the frequency range of the uphole communications signals, i.e., 60–124 kHz, the ratio of the choke impedance magnitude to the transmission line characteristic impedance may range from 2 to 4 and preferably be between 2.7 to 3.7.

The inductance of a lossless coaxial choke is proportional to three factors: 1) permeability, 2) length, and 3) the log ratio of the outer diameter to the inner diameter. These relationships hold sufficiently well for a lossy choke to provide a basis for extrapolating the design of another choke so long as the ratio of the outer diameter to the inner diameter is not varied too much. If $M_0$ is the impedance magnitude at a predetermined frequency for the 1-mil Supermalloy choke having the characteristics depicted in FIG. 11, then the extrapolated impedance and dimensions can be accomplished by:

$$\frac{M_x}{M_0} = \frac{L_x}{7.5 \cdot \text{in}} \cdot \frac{\ln\left(\frac{d_{0x}}{d_{ix}}\right)}{\ln(2)} \quad (5)$$

where $L_x$ is the length of the new choke, and $d_{0x}/d_{ix}$ is the ratio of the new outer and inner diameters.

The selection of the operating frequencies for both the downhole power/data signal and the uphole communications signal is a consideration that impacts several aspects of the system. Selection of a suitable power frequency is a tradeoff between two competing considerations. The first consideration is to increase the frequency thereby reducing the size of the various chokes and also enabling higher data rates to be used. Reducing the size of the various chokes is an important consideration as it will facilitate handling, and permit the use of the chokes in wells having limited clearance, such as multiple-completion wells. The second consideration is to decrease the frequency and thereby reduce the series impedance of the piping structure 111/casing 104 coaxial structure. This will decrease the effect of the skin effect that imposes the major limitation on the available power transmitted downhole. In particular, for a choke having an inner diameter of 3.2", which allows for a clearance for the 3" piping structure, and an outer diameter of 5.5", the length of the choke can be limited to approximately 20" using the parameters discussed herein. That is a maximum well depth of 10,000 feet, a downhole frequency between 0.60 kHz and 7 kHz, and a downhole data rate between 4 KBPS and 28 KBPS.

The bit rate on the downhole communications is also constrained by the available bandwidth and carrier frequency. The downhole communications signal is in a relatively benign signal to noise environment and is in a fixed physical structure. Accordingly, it is reasonable to assume useable bit rates from 4 to 8 bits/Hz on the downhole power/data signal using a frequency that is low enough to avoid transmission line effects. As discussed earlier, assuming a 12-volt rms surface supply, increased skin effect series impedance becomes the limiting factor of available power due to $V^2/R_{sk}$. Phase-modulation with a 16 or 256 point constellation, such as 16 QAM, is a reasonable design choice.

Typical limitations of available downhole power transmission can be illustrated by an example. If the outer diameter of the piping structure 111 is 3", the inner diameter of the casing 104 is 9", the well depth is 10,000 ft., the power frequency is 1000 Hz, and the surface supply voltage is 12-volts rms. It can be shown that Rsk=5.25 Ω, $X_{sk}$=5.25 Ω, $X_L$=4.21 Ω, and $X_c$=−1033 Ω. Note that the shunt capacitive reactance is 2.5 orders of magnitude greater than the other parameters and may be disregarded. At the bottom of the well, the source impedance back to the surface supply is 5.25+j9.47Ω. The maximum power that can be transferred from the 12-volt rms surface supply is approximately 6.9 W, wherein the load to extract this power must be the complex conjugate of the source impedance. This can be achieved through a careful circuit design.

If the piping structure 111 and case 104 are electrically shorted at the bottom of the well borehole, a bottom choke is added to isolate this electrical short as was the surface choke as described above. In this instance, the complex source impedance will change and thus, the power matching networks will need to be modified. So long as the introduced elements contain reactive components and only small resistive components, the total power transfer will remain substantially unchanged.

Table 1 provides seven different configurations that illustrate various trade-offs. The following configurations are included for exemplary purposes only and should not be considered to be limiting in any way:

TABLE 1

| Well Depth | No. of modems | Frequency | Power |
|---|---|---|---|
| 10,000 ft. | One modem at the well bottom | 1 kHz | 6.9 W |
| 10,000 ft. | 2 modems, one mid-well series-connected, one at the well bottom | 1 kHz | 3.4 W/modem |
| 10,000 ft. | 3 modems, 2 mid-well series-connected, 1 at the well bottom | 1 kHz | 2.3 W/modem |
| 10,000 ft. | One modem at the well bottom | 4 kHz | 3.4 W |
| 5,000 ft. | One modem at the well bottom | 1 kHz | 13.8 W |
| 5,000 ft. | One modem at the well bottom | 7 kHz | 5.8 W |
| 10,000 ft. | Two modems, one mid-well parallel-connected, one at the well bottom | 1 kHz | 5.0 W/modem |

As Table 1 depicts, higher frequencies may be used as the carrier frequency of the downhole power/data signal, however, the use of higher frequencies reduces the downhole power availability. As discussed above, for multiple downhole modems, a parallel connection of the mid-well modems yields greater available downhole power than does series connection. Also, if a higher frequency, say 4 kHz, is selected and, assuming that 4 bits/Hz QAM modulation is used, the data rate can be increased from 4 KPBS to 16 KBPS. Similarly, a carrier frequency of 7 kHz results in a data rate of 28 kbps.

As discussed above, the frequency of the uphole communications signals is higher than the frequency of the downhole power/data signal. The frequency of the uphole communications signal should be sufficiently separated from the frequency of the downhole signal to allow easy filtering and separation of the two signals. In addition, the frequency of the uphole communications signal should be below the operating frequency of any downhole switching power supplies. As discussed above, in the illustrated embodiment, the frequency of the uphole communications signal has been selected to be between 60–124 kHz.

In the selected uphole communications frequency range, a 10,000 foot well is between 0.6 and 1.24 wavelengths long. In this frequency range the piping structure/casing coaxial structure acts as a transmission line and is modeled as depicted in FIG. 7. The downhole choke can be easily matched to the characteristic impedance of the well structure over a narrow bandwidth using the equations provided above. However, although this would imply minimal reflections, the extent to which this match may be maintained over frequency is uncertain.

The impedance match can be improved by sizing the downhole choke impedance to be noticeably greater than the characteristic impedance of the well structure and providing a network in parallel with the choke so as to provide a better impedance match.

If the impedance match is poor, operation over a broad bandwidth will encounter multiple reflections. The consequent multipath propagation of signals throughout the well structure will result in many reflected signals arriving at a receiver at different times causing inter-symbol interference (ISI). This in turn will increase the bit error rate, forcing a drop in the data rate as discussed above with respect to the functioning of the protocol processor.

It is known in radio frequency systems that radio signals suffer from fading caused by multipath propagation. As is also known in radio frequency systems, single carrier techniques are vulnerable to fading and multipath propagation problems. Multi-carrier techniques are used in radio frequency systems, however, to cope with these problems. In particular, orthogonal frequency division multiplexing (OFDM) is used to transmit many narrow overlapping digital signals in parallel within a single wide bandwidth. OFDM increases the number of parallel transmission channels and reduces the data rate that each individual channel must transmit. This reduction in the data rate of each individual channel increases the symbol period of each channel, reducing the affect of ISI on each symbol. Thus, the larger the number of channels, the less affect ISI will have on any one symbol.

In the communications and power system described herein, the downhole communications signal, which is carried on the power signal, has a high signal-to-noise ratio. However, the up-channel communications signal is far weaker and hence the signal-to-noise ratio is much less. Accordingly, the effect of multipath propagation and the reflections therefrom have a much larger effect on the up-channel signals.

Preferentially therefore, the up-channel communications signals are transmitted using OFDM using QPSK modulation. If 1000 symbols/sec are transmitted over 64 kHz, there are accordingly 64 orthogonal channels with 1 kHz spacing therebetween. QPSK modulated data on each channel at 2 symbols/sec yields an aggregate data rate of 2*1000*64= 128 KBPS. However, the transmission environment within a well borehole is such that some of these channels will be impaired and unable to transmit data. An adaptive system that finds an optimal subset of 16 channels can therefore be employed that provides a robust 32 KBPS data rate for the up-channel signal.

In one embodiment, at the initial power-up the adaptive system queries the downhole modem(s) and the downhole modem replies using a redundant signal that occupies all 64 channels in the predetermined frequency channels. The surface modem decodes the redundant symbols received, and records the raw bit error rate experienced on each of the predetermined frequency channels. Depending on the bit error rates experienced during this query/reply training sequence, the training sequence is repeated a number of times. The surface modem selects the 16 channels having the lowest raw bit error rate and provides these 16 channels to the downhole modem. The downhole modem is responsive to the received channel provided by the surface modem and transmits only on these selected frequencies. In this way the up-channel transmitter power is concentrated within the "best" part of the predetermined frequency channels, where best indicates the channels having the lowest raw bit error rates. This process is repeated for each of the downhole modems, and in general each downhole modem employs a different frequency channel set. During normal operation, the surface modem monitors the bit error rates of each downhole modem. If the bit error rates corresponding to a particular downhole modem increases to a rate such that significant packet retries are required, the surface modem will repeat the query/reply training sequence for that downhole modem. Otherwise, the existing frequency channels selected at the initial power-up are used. The corresponding subset of frequencies selected for each downhole modem by the surface modem will be retained in the event of a downhole power failure, and is used by the downhole modem upon a subsequent re-start. Alternatively, if the bit error rate is below a predetermined threshold, all 64 channels could be employed in passing data up-channel. The use of all 64 channels would result in an up-channel data rate that is four times higher than the 16-channel data rate. In this embodiment, the transfer rate could thus be adapted to the channel conditions and more channels could be used for those downhole modems having a sufficiently low bit error rate.

Alternatively, OFDM could be used for the down-channel data signal as well. This embodiment might be useful in situations where the length of the piping structure dictates a very low power frequency, but a high down-channel data transfer rate is required by the downhole electronic equipment. In such a system, the up-channel and down-channel signals would co-exist in the 60–124 kHz frequency range, or other suitable frequency range. In this embodiment the system could support either half or full duplex signal operation, and, in addition, packets can be relayed from one downhole modem to the next in order to extend the effective range of the communications signals. In this embodiment, the power signal is no longer modulated with the down-channel data signal and the two signals are therefore separately transmitted signals.

In a system that utilizes OFDM both for up-channel and down-channel signals, each signal is preferably modulated using QPSK, although other digital modulation schemes that allow for orthogonal signaling may be used. As discussed above, this configuration is appropriate in cases where the length of the piping structure requires a low frequency power signal, for example in the 60 Hz–500 Hz frequency range. In this embodiment, due to the lower frequency, a downhole choke having an impedance that is able to extract sufficient power from the power signal will have to be larger than the chokes described above with respect to the combined power/data signal.

Figure 13:
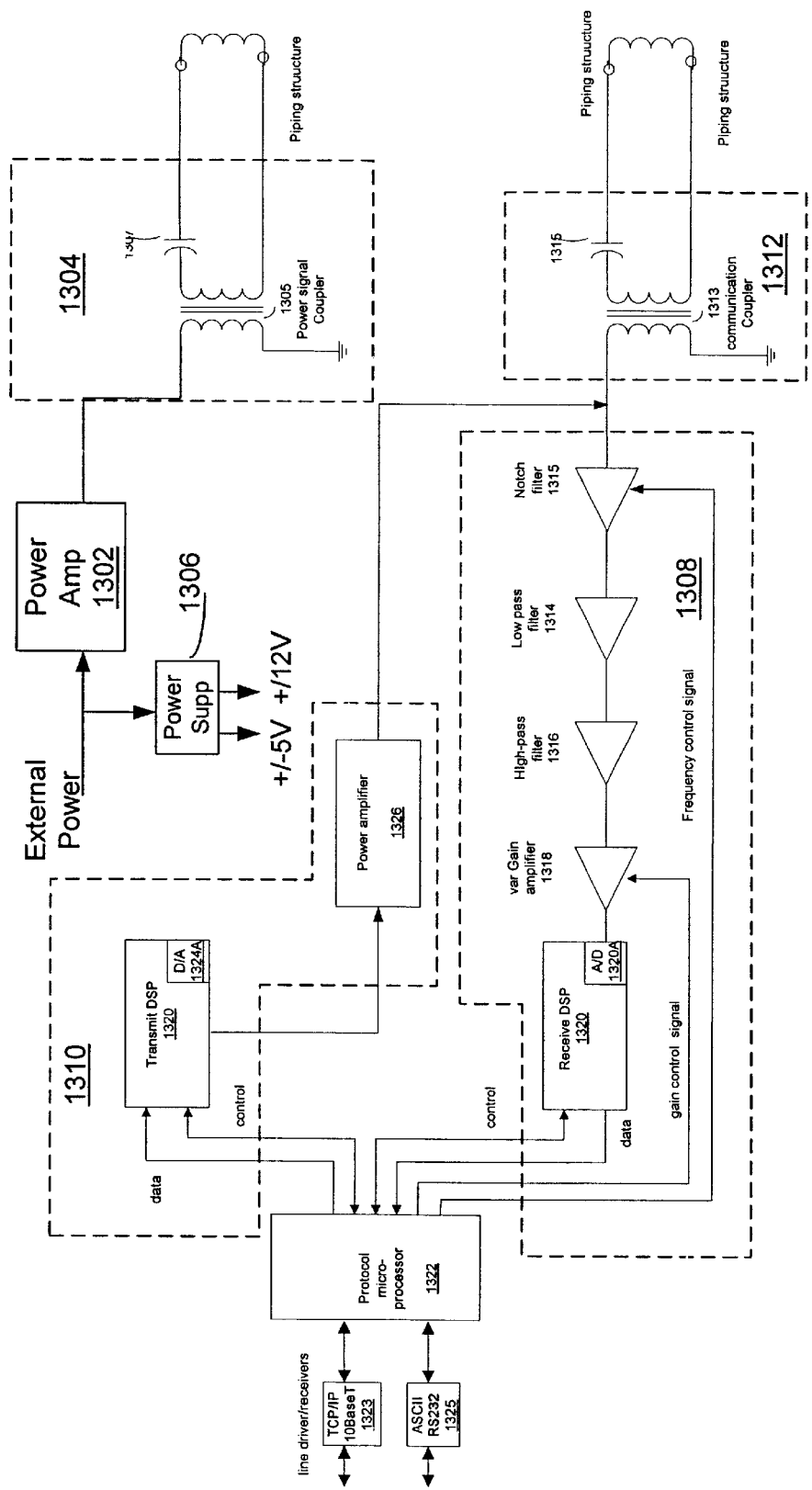
FIG. 13 is a block diagram of the surface system depicted in FIG. 1, where the system employs OFDM for both the down-channel and the up-channel.

FIG. 13 depicts a surface system capable of providing a power signal and a QPSK OFDM downhole signal. The surface system 1300 includes a power amplifier 1302 is coupled to an external power source 1301 and provides a power signal to the power signal coupling network 1304 that includes transformer 1305 and series capacitor 1307. The power signal coupling network 1304 is coupled to the case and piping structure as described above. The power coupling network operates as described above. The external power source 1301 is also coupled to a power supply 1304 that provides the voltages necessary for the proper operation of the electronic equipment in the surface system 1300. In the illustrative embodiment, the output voltages of power supply 1306 are +/−5V and +/−12V.

The surface system 1300 also includes the data receiver 1308 and transmitter 1310. The data receiver 1308 and transmitter 1310 are coupled to the case and piping structure via data coupling network 1312 that includes a transformer 1313 and series capacitor 1315. The data coupling network 1312 operates as described above. The data receiver 1308 is similar to the receiver 402 depicted in FIG. 4, however the receiver DSP 1320 and the protocol processor operate to demultiplex the OFDM signals and demodulate the QPSK modulated data therefrom. The receiver includes filters 1314 and 1316 and a notch filter 1328 to provide attenuation of the power signal and a variable gain amplifier that has the gain level set by the protocol processor 1320 as described above. The amplifier output is provided to an A/D converter 1320A that provides a digital representation of the received signal to the receiver DSP 1320 for processing.

The system 1300 also includes a data transmitter 1310 that includes a transmit DSP 1324 and an output transmit D/A 1324A. The transmit DSP 1324 in conjunction with the protocol processor operate to modulate a carrier signal in the 60–124 kHz range with data using a QPSK modulation scheme and frequency multiplex this signal using OFDM. The modulated and multiplexed signals are provided to the D/A converter 1324A and the analog output provided to the data transmitter amplifier 1326. The data transmitter amplifier 1326 is coupled to the data coupling network 1312 for transmission on the case and piping structure as described above.

As discussed above, it may be desirable to provide a relay function to extend the range of the communications signals in very deep wells. In such a relay system, each downhole modem would receive and buffer every message from the surface, whether it was addressed to that particular modem or not. A modem that received a message not addressed to itself would listen for an acknowledgement response from the downhole unit which had been addressed. If the modem did not receive an acknowledgement response within a predetermined time-out period, or if the acknowledgement response was received within the predetermined time-out period but was corrupted, the modem would decrement the relay field of the message, and retransmit it. In this fashion, modems that are further downhole can relay messages that could not otherwise reach the lower portion of the well. The messages could be retransmitted one or more times, and eventually be received by the intended modem. The downhole modems can operate in a chorus mode, wherein each downhole modem retransmits the received message at the same time. Alternatively, a predetermined subset of the downhole modems could be used to retransmit the received message. Alternatively, one or more downhole modems could be selected based on one or more characteristics of the received signal to retransmit the received message. A complementary procedure would be used for relaying signals in the up-channel path to the surface modem. A relay capability may not be required in both directions due to the asymmetry of the transmission path in the uphole and downhole directions. However, because these conditions change with time, the capability to relay signals in both directions should be provided. Alternatively, the downhole modems may retransmit the acknowledgement signal to the surface modem. If the surface modem did not receive an acknowledgement response within a predetermined time-out period, or if the acknowledgement response was received within the predetermined time-out period but was corrupted, the surface modem retransmit it.

As discussed above, each oil or gas well presents a unique and harsh environment for the transfer of power and control signals downhole and telemetry data uphole. In particular, the depth of the well, the layout of the well, whether the well includes branches, etc. influences the design and operation of the systems described in this document. As discussed above, the surface modem and each downhole module includes a protocol processor as well as receive and transmit DSPs. The ability to reprogram one or more of these devices would allow an oil or gas well to be optimized based on the conditions observed at the well. In particular, one or more of the protocol processor, the receive DSP, and the transmit DSP can include flash memory that can be reprogrammed remotely from the surface, via the downhole power/data signal. This reprogramming can include the particular frequencies to be used, particular modulation schemes to be used, the amount of signal power, and other communication system parameters. This ability for reprogramming can be accomplished using internal or external FLASH memory and appropriate commands. Alternatively, other programmable memory included in the downhole module and coupled to the corresponding processor may be used as well. Moreover, one or more of the sensors or actuators may also include a processor and FLASH memory or other programmable memory. Reprogramming these processors can also be accomplished via the downhole power/data signal as well. In addition, the surface modem may be reprogrammed with updated algorithms and communications parameters as well. The surface modem may be reprogrammed either remotely via a wide area network such as the internet or company intranet, via a processor module located at or near the well itself, or the surface modem protocol processor or other processor associated with the surface equipment may reprogram data stored locally based on the data received from the downhole modem(s).

Figure 12:
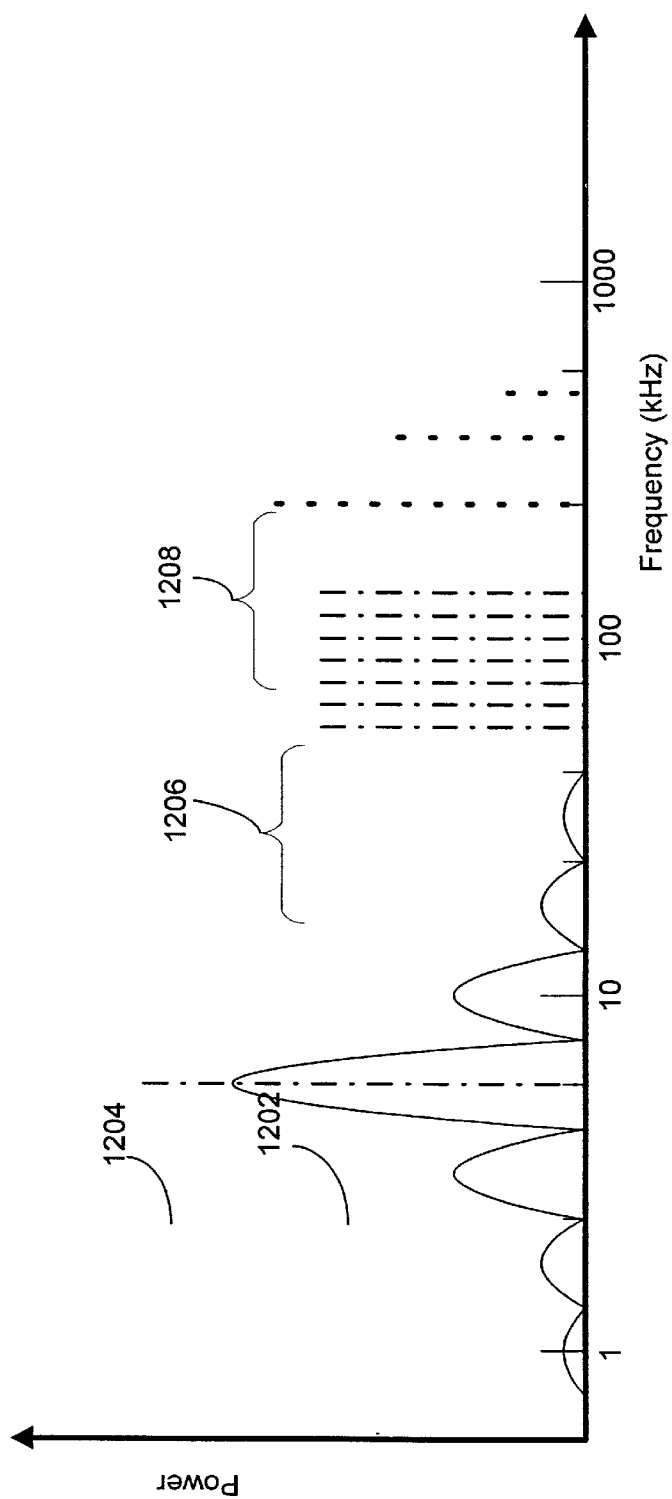
FIG. 12 is a representation of the spectra of various signals used in the downhole communications system depicted in FIG. 1.

FIG. 12 depicts the frequency spectra of the signals used in the illustrated embodiment of the downhole communications system described herein. The power supply frequency at the unmodulated carrier frequency is depicted by spectrum 1204, and the spectrum of the power signal modulated with the data heading downhole is illustrated by spectrum 1202. Spectra 1206 represents the spectrum of the up-channel OFDM signal, and spectrum 1208 represents the switching frequency and associated harmonics of the switching power supplies used in the downhole modules. In the embodiment in which OFDM is used for both the up-channel and down-channel communications signals, the spectrum 1202 would not be present and the up-channel and down-channel communications signals would be located within the spectrum 1206 and the power signal would be located within the spectrum 1204.

Those of ordinary skill in the art should further appreciate that variations to and modification of the above-described methods, apparatus and system for communicating with equipment and sensors located downhole in an oil or gas well may be made without departing from the inventive concepts disclosed herein. Accordingly, the invention should be viewed as limited solely by the scope and spirit of the appended claims.

What is claimed is:

1. A downhole telemetry and power system for use with a borehole extending into a formation, the borehole including a casing positioned within the borehole and a piping structure contained within the casing, the system comprising:

a surface choke coupled to the piping structure;

a surface system including a data source providing data to be transmitted, a power amplifier coupled to the data source and to an external power source, the power amplifier having an output electrically coupled to the casing and the piping structure downhole from the surface choke, the power amplifier operative to provide a power signal having a first frequency and to modulate, in a first modulation scheme, the power signal with the data to be transmitted, wherein the first frequency of power signal is selected as a function of the depth of the borehole;

a downhole choke having a first inductance, the downhole choke disposed downhole a predetermined distance within the borehole and disposed coaxially about the piping structure, wherein the first inductance is selected as a function of the depth of the borehole;

a downhole system including a power supply electrically coupled to the downhole choke, the power supply configured and arranged to receive at least a portion of the modulated power signal and to provide at least one output voltage, the downhole system further including a receiver electrically coupled to the choke coil and configured and arranged to demodulate the modulated power signal to recover the data to be transmitted.

2. The system of claim 1 wherein the first frequency is between 750 Hz and 6000 Hz.

3. The system of claim 1 wherein the first frequency is further determined as a function of the choke length.

4. The system of claim 3 wherein the first frequency is determined to provide the choke length to be less than 20".

5. The system of claim 4 wherein the first frequency is determined to provide the choke length to be less than 10".

6. The system of claim 5 wherein the first frequency is determined to provide the choke length to be less than or equal 7.5".

7. The system of claim 1 wherein the first frequency is determined to provide a minimum of 2 watts to the downhole system.

8. The system of claim 7 wherein the first frequency is determined to provide a minimum of 3 watts to the downhole system.

9. The system of claim 8 wherein the first frequency is determined to provide a minimum of 5 watts to the downhole system.

10. The system of claim 9 wherein the first frequency is determined to provide a minimum of 7 watts to the downhole system.

11. The system of claim 10 wherein the first frequency is determined to provide a minimum of 13 watts to the downhole system.

12. The system of claim 1 wherein the first inductance is further determined as a function of the characteristic impedance of the casing and piping structure.

13. The system of claim 12 wherein the first inductance is determined to provide an impedance at the first frequency that is substantially equal to the characteristic impedance of the casing and piping structure.

14. The system of claim 12 wherein the first inductance is determined to provide an impedance at the first frequency that is greater than to the characteristic impedance of the casing and piping structure.

15. The system of claim 14 wherein the first inductance is determined to provide an impedance at the first frequency that is 2 to 4 times greater than the characteristic impedance of the casing and piping structure.

16. The system of claim 15 wherein the first inductance is determined to provide an impedance at the first frequency that is 2.7 to 3.7 times greater than the characteristic impedance of the casing and piping structure.

17. The system of claim 1 wherein the first modulation scheme is amplitude modulation.

18. The system of claim 1 wherein the first modulation scheme is frequency modulation.

19. The system of claim 18 wherein the first modulation scheme is frequency shift keying.

20. The system of claim 1 wherein the first modulation scheme is phase modulation.

21. The system of claim 20 wherein the first modulation scheme is phase shift keying.

22. The system of claim 1 wherein the first modulation scheme is amplitude and phase modulation.

23. The system of claim 12 wherein the first modulation scheme is 16 QAM modulation.

24. The system of claim 1 wherein the downhole system is electrically coupled across the downhole choke.

25. The system of claim 1 wherein the downhole system is electrically coupled between the piping structure and the case.

26. The system of claim 1 wherein the downhole system further includes a downhole transmitter coupled to a downhole data source and electrically coupled to the downhole choke, the transmitter configured and arranged to provide a carrier signal and to modulate the carrier signal with the downhole data to be transmitted in a second modulation scheme and to impress the modulated carrier signal onto the downhole choke to be transmitted via the piping structure.

27. The system of claim 26 wherein the surface system further includes a surface receiver electrically coupled to the piping structure, the surface receiver configured and arranged to receive the modulated carrier signal from the downhole transmitter and to demodulate the modulated carrier signal and recover the downhole data to be transmitted.

28. The system of claim 26 wherein the second modulation scheme is a digital modulation scheme.

29. The system of claim 28 wherein the digital modulation scheme is QPSK.

30. The system of claim 28 wherein the second modulation scheme is an orthogonal frequency division multiplexed (OFDM) signal.

31. The system of claim 30 wherein the OFDM signal includes 64 channels.

32. The system of claim 31 wherein a predetermined number of channels having the lowest bit error rates are selected to transmit up-channel data.

33. The system of claim 32 wherein the number of predetermined channels is less than 32.

34. The system of claim 33 wherein the number of predetermined channels is 16.

35. The system of claim 1 wherein the downhole system includes a plurality of downhole systems and a plurality of downhole choke coils, each downhole system electrically coupled to a corresponding downhole choke coil.

36. The system of claim 1 wherein the downhole receiver includes an input variable frequency notch filter electrically coupled to the downhole choke coil and an having an output coupled to a variable gain amplifier, the downhole receiver further includes a protocol processor that adjusts the center frequency of the variable frequency notch filter and also adjusts the gain of the variable gain amplifier.

37. The system of claim 36 wherein the gain adjustment of the variable gain is a function of the bit error rate of the down-channel data transmission.

38. The system of claim 36 wherein the frequency adjustment of the variable frequency notch filter is a function of the bit error rate of the down-channel data transmission.

* * * * *

UNITED STATES PATENT AND TRADEMARK OFFICE
CERTIFICATE OF CORRECTION

PATENT NO. : 6,747,569 B2 Page 1 of 1
APPLICATION NO. : 10/062293
DATED : June 8, 2004
INVENTOR(S) : Lawrence W. Hill et al.

It is certified that error appears in the above-identified patent and that said Letters Patent is hereby corrected as shown below:

Column 1, line 7, "§19 (e)" should read --§119 (e) --;

Column 3, line 5, "Downhole the" should read --The downhole--;

Column 3, lines 44 – 45, delete "between the time delay dispersion for a typical 10,000 ft. deep well and frequency;" ;

Column 3, after line 45, insert the following paragraph:
--Fig. 10 is a graph depicting the calculated relationships between the time delay dispersion for a typical 10,000 ft. deep well and frequency; --

Column 5, line 40, "production tubing is" should read --production tubing and is--;

Column 5, lines 47 – 48, "acts the" should read --acts as the--;

Column 6 , line 33, "provides" should read --provide--; and

Column 11, line 15, "skin 111" should read --skin effect can exceed the coaxial inductance, i.e., the inductance calculated based on the magnetic flux within the coaxial annulus. The skin effect impedance of the casing 104 and piping structure 111-- .

Signed and Sealed this

Ninth Day of January, 2007

JON W. DUDAS
*Director of the United States Patent and Trademark Office*